United States Patent
Smith et al.

[11] Patent Number: 5,875,224
[45] Date of Patent: Feb. 23, 1999

[54] SWIRLER ATTACHMENT FOR A SPACER OF A NUCLEAR FUEL BUNDLE

[75] Inventors: David G. Smith, Leland; Harold B. King, Wrightsville Beach; Jeffrey A. Wilson, Wilmington; Andrew A. Lingenfelter, Wilmington; Michelle Wagner, Wilmington, all of N.C.

[73] Assignee: General Electric Company, Schenectady, N.Y.

[21] Appl. No.: 921,600

[22] Filed: Sep. 2, 1997

[51] Int. Cl.$^6$ .............................. C21C 3/32; C21C 3/34
[52] U.S. Cl. .......................................... 376/439; 376/443
[58] Field of Search ........................ 376/439, 441–443, 376/371, 373, 377, 435, 446

[56] References Cited

U.S. PATENT DOCUMENTS

| | | | |
|---|---|---|---|
| 2,594,490 | 4/1952 | Patterson | 55/323 |
| 3,070,537 | 12/1962 | Treshow | 376/439 |
| 3,144,393 | 8/1964 | Raber et al. | 376/371 |
| 3,253,999 | 5/1966 | Weisman | 376/371 |
| 3,329,130 | 7/1967 | Cochran | 122/34 |
| 3,769,781 | 11/1973 | Klein et al. | 96/372 |
| 3,814,666 | 6/1974 | Calvin | 376/439 |
| 3,847,736 | 11/1974 | Bevilacqua | 376/439 |
| 3,886,038 | 5/1975 | Raven | 376/439 |
| 3,902,876 | 9/1975 | Moen et al. | 55/345 |
| 4,045,287 | 8/1977 | Van Santen | 376/440 |
| 4,100,888 | 7/1978 | Fasnacht, Jr. | 122/438 |
| 4,189,348 | 2/1980 | Donck et al. | 376/456 |
| 4,684,501 | 8/1987 | Lui | 376/446 |
| 4,698,204 | 10/1987 | Taleyarkhan | 376/439 |
| 4,775,510 | 10/1988 | Bryan | 376/443 |
| 4,856,461 | 8/1989 | Hayes | 122/488 |
| 4,882,557 | 4/1989 | Suzuki et al. | 376/282 |
| 4,913,875 | 4/1990 | Johansson et al. | 376/439 |
| 5,017,332 | 5/1991 | Dix et al. | 376/370 |
| 5,068,082 | 11/1991 | Ueda et al. | 376/428 |
| 5,091,146 | 2/1992 | Dix | 376/443 |

(List continued on next page.)

FOREIGN PATENT DOCUMENTS

| | | | |
|---|---|---|---|
| 523265 | 1/1993 | European Pat. Off. | 376/439 |
| 605816 | 7/1994 | European Pat. Off. | 376/439 |
| 619581 | 10/1994 | European Pat. Off. | 376/439 |
| 9018490 | 1/1984 | Japan . | |
| 9203-986 | 11/1984 | Japan . | |
| 1029-794 | 1/1989 | Japan . | |
| 1269-086 | 10/1989 | Japan . | |
| 03051796 | 3/1991 | Japan | 376/439 |
| 4-244995 | 9/1992 | Japan | 376/370 |
| 4-357494 | 12/1992 | Japan | 376/439 |
| 5-150064 | 6/1993 | Japan | 376/435 |
| 5-157867 | 6/1993 | Japan | 376/443 |
| 6-75082 | 3/1994 | Japan | 376/370 |
| 06-109884 | 4/1994 | Japan . | |
| 06-230163 | 8/1994 | Japan . | |
| 6-273571 | 9/1994 | Japan | 376/370 |
| 0716974 | 7/1995 | Japan | 376/439 |
| 07-244183 | 9/1995 | Japan . | |

OTHER PUBLICATIONS

Itagaki, Fuel Assembly for Boiling Water Reactor, Patent Abstracts of Japan, JP 06–109884, Apr. 1994.

Yamamoto et al., Fuel Spacer and Fuel Assembly, Patent Abstracts of Japan, JP 06–230163, Aug. 1994.

Goto et al., Fuel Assembly for Boilg Water Reactor, Patent Abstracts of Japan, JP 07–244183, Sep. 1995.

*Primary Examiner*—Charles T. Jordan
*Assistant Examiner*—M. J. Lattig
*Attorney, Agent, or Firm*—Nixon & Vanderhye

[57] ABSTRACT

A swirler is releasably attached to a spacer and lies in the opening through the spacer lying above a part-length fuel rod in a nuclear fuel bundle. Adjacent ferrules have upstanding tabs with loops forming part of connecting elements for releasably securing the swirler to the spacer. The spacer is mounted on a mounting ring having radially outwardly directed elements terminating in barbed ends for insertion through the loops in response to rotation of the swirler mounting ring relative to the tabs. The barbed ends can be squeezed together to release the swirler from its attachment with the spacer.

12 Claims, 5 Drawing Sheets

U.S. PATENT DOCUMENTS

| | | | |
|---|---|---|---|
| 5,112,570 | 5/1992 | Dix et al. | 376/370 |
| 5,164,155 | 11/1992 | Wolters et al. | 376/441 |
| 5,202,084 | 4/1993 | Fennern et al. | 376/433 |
| 5,219,519 | 6/1993 | Matzner | 376/412 |
| 5,229,068 | 7/1993 | Johansson et al. | 376/371 |
| 5,245,643 | 9/1993 | Dix et al. | 376/371 |
| 5,299,245 | 3/1994 | Aldrich et al. | 376/439 |
| 5,327,471 | 7/1994 | Meier et al. | 376/439 |
| 5,327,472 | 7/1994 | Kraemer et al. | 376/439 |
| 5,345,485 | 9/1994 | Patterson et al. | 376/435 |
| 5,365,557 | 11/1994 | Meseth | 376/439 |
| 5,371,768 | 12/1994 | Matzner | 376/439 |
| 5,375,153 | 12/1994 | Patterson et al. | 376/435 |
| 5,384,815 | 1/1995 | Patterson et al. | 376/444 |
| 5,384,875 | 1/1995 | Shannon et al. | 385/51 |
| 5,416,812 | 5/1995 | Matzner | 376/371 |
| 5,491,733 | 2/1996 | Patterson et al. | 376/443 |

SWIRLER ATTACHMENT FOR A SPACER OF A NUCLEAR FUEL BUNDLE

TECHNICAL FIELD

The present invention relates to swirler attachments for spacers in a nuclear fuel bundle and particularly relates to a releasable swirler attachment for a spacer enabling installation of the swirlers during the bundle assembly process and removal of the swirlers in the field.

BACKGROUND

In nuclear fuel bundles having part-length fuel rods, it has been proposed to provide swirlers in the fuel bundle in the space above the part-length fuel rods to direct the flow of coolant/moderator into and between the fuel rods laterally adjacent the space. Prior swirler designs typically mount the swirlers on the spacer or spacers above the upper end of the part-length fuel rods. The swirlers are either integrated into the spacer body or are welded to the spacer. In both cases, the spacers are not separate entities after installation and cannot be removed absent disassembly of the bundle. Swirlers fixed to the spacer, for example, by welding, require additional bundle assembly process steps, which are labor-intensive and, hence, increase the costs of the fuel bundle. Moreover, the swirlers cannot be removed from the spacer in the event of a failure of the part-length fuel rod without disassembly of the bundle and shipment of the bundle skeleton to a repair site. While there is thus a demonstrated need for a swirler which can be readily attached and detached relative to the spacer, it is quite counterintuitive to provide a removable swirler in a nuclear fuel bundle. That is, strenuous efforts are made to maintain the structure of the fuel bundle and ancillary reactive parts intact during operation and the concept of having a removable part within the nuclear fuel bundle would be counter to the longstanding desire to avoid unsecured parts in the reactor.

DISCLOSURE OF THE INVENTION

In accordance with the present invention, there is provided a swirler for mounting on one or more spacers of a nuclear fuel bundle wherein the swirler can be readily attached and detached from the spacer, affording access to and, hence, enabling removal of a part-length fuel rod. By enabling the swirler to be releasably attached to the spacer, the need to weld swirlers to the spacers after insertion of the part-length fuel rod is eliminated, while simultaneously the ability to remove the swirler in service if the part-length fuel rod fails is afforded. To accomplish this, and in a preferred form hereof, the spacer may be a ferrule-type spacer having individual cylindrical cells for receiving the fuel rods of the nuclear fuel bundle. For those spacers above a part-length fuel rod, the ferrule at that axial location is omitted and a swirler is releasably mounted to and preferably above that spacer. To mount the swirler, at least a pair of oppositely disposed ferrules in part defining the opening through the spacer above the part-length fuel rod are provided with diametrically opposed upstanding connecting elements or tabs. Each tab has a segment projecting out of the plane of the element toward the opposite tab, the element and its segment thereby defining a loop. Preferably, a pair of slits are formed in the upstanding tab and the material between the slits is pressed out of the plane of the tab toward the opposite element to form the loop. The base of the tab also has a projection extending toward the opposite tab to provide a stop for the mounting ring of the swirler, which will now be described.

The mounting ring comprises a circular band having at circumferentially spaced positions thereabout a plurality of radially outwardly projecting connecting members. Each member has a distal end in the form of a triangular barb. The barb has a central split such that the sides of the barb can be displaced toward and away from one another. The member also includes a reduced thickness shank coupling the distal end of the member, i.e., the barb, to a leg of the member. The shank includes a radially outwardly projecting button or projection for releasably locking the connecting member in the loop when attached thereto. The mounting ring also carries at a plurality of circumferentially spaced positions thereabout a plurality of upstanding tabs which form bases for mounting the swirler. The swirler may thus be welded to the upstanding tabs of the mounting ring, with the mounting ring in turn being releasably secured to the ferrule spacer.

To attach the swirler to the spacer, the mounting ring is disposed over the opening of the ferrule spacer between the tabs with the connecting members of the ring spaced circumferentially from the tabs. By rotating the mounting ring, the barb ends of the connecting elements may be inserted into the loops. Thus, the tapered sides of the barb compress the barb, enabling insertion of the barb into the loop until such time as the side sections of the barb are able to spring back from their uncompressed condition to secure the connecting element to the member. When it is desired to remove the swirler, a suitable tool can be inserted into the fuel bundle to squeeze the end sections of the barb toward one another. The mounting ring is then rotated to withdraw the barb from the loop, thus freeing the swirler for withdrawal from the bundle.

In a preferred embodiment according to the present invention, there is provided a swirler attachment for a spacer in a nuclear fuel bundle, comprising a plurality of ferrules forming a spacer for receiving nuclear fuel rods of the nuclear fuel bundle, at least a pair of opposed ferrules spaced from one another defining an opening therebetween, the pair of ferrules each having a ferrule body having a connecting element and a swirler carrying at least a pair of connecting members for releasable connection with respective ones of the connecting elements thereby releasably securing the swirler and the pair of ferrules to one another.

In a further preferred embodiment according to the present invention, there is provided a swirler attachment for a spacer in a nuclear fuel bundle, comprising a spacer having a plurality of cells for receiving nuclear fuel rods of the nuclear fuel bundle, each cell being defined by a fuel rod support body, at least a pair of opposed bodies spaced from one another defining an opening therebetween, the pair of bodies each having a connecting element and a swirler carrying at least a pair of connecting members for releasable connection with respective ones of the connecting elements thereby releasably securing the swirler and the pair of support bodies to one another.

Accordingly, it is a primary object of the present invention to provide a swirler for disposition in a spacer above a part-length fuel rod and which swirler can be releasably secured to the spacer.

BEST MODE FOR CARRYING OUT THE INVENTION

Figure 1:
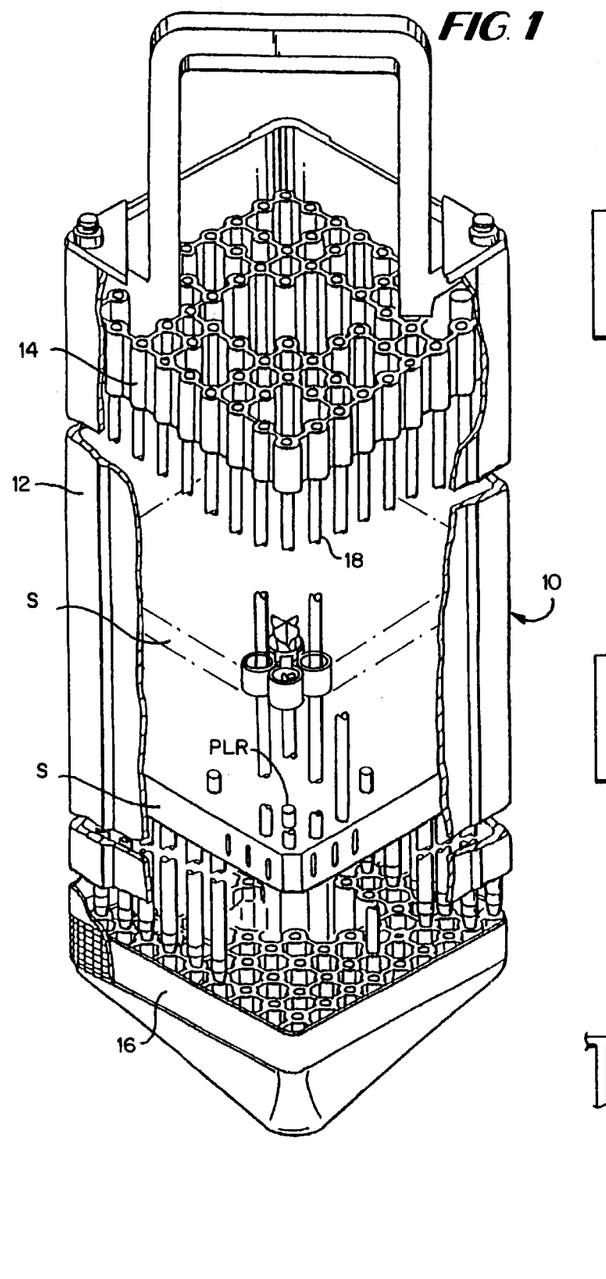
FIG. 1 is a cross-sectional view of a nuclear fuel bundle illustrating the location of the spacer and swirler attachment thereto in the fuel bundle.
Figure 2:
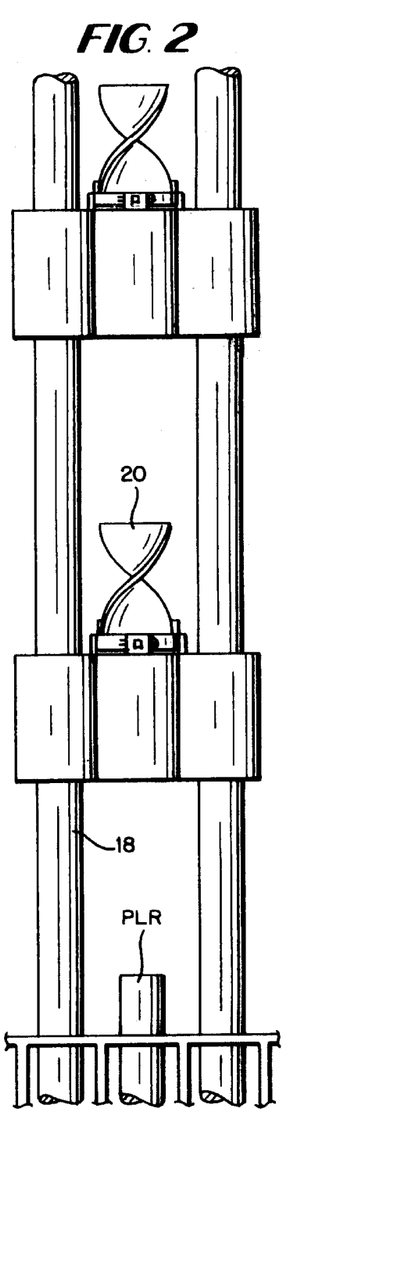
FIG. 2 is an enlarged fragmentary vertical elevational view illustrating the spacer with swirler attached and above a part-length rod.

Referring now to FIG. 1, there is illustrated a conventional nuclear fuel bundle, generally designated 10, with the exception of the spacer and swirler attachment which is in accordance with the present invention. The nuclear fuel bundle includes a channel 12 extending between upper and lower tie plates 14 and 16, respectively, and confining within the channel a plurality of vertically extending, laterally spaced fuel rods 18. As is conventional, the fuel rods pass through spacers S at discrete elevations along the vertically extending fuel bundle 10. As illustrated in FIG. 1, a part-length fuel rod PLR is shown, terminating at its upper end below a spacer S. The next spacer typically has an opening where the fuel rod would have been were it not a part-length fuel rod. To direct coolant/moderator flowing through the opening in the spacer above the part-length fuel rod and into the interstices between the full-length fuel rods above that spacer opening rather than channel the coolant/moderator through the open space, a swirler 20 (FIG. 2) is releasably mounted in accordance with the present invention on the spacer above the upper end of the part-length fuel rod and on other spacers at higher elevations along the fuel bundle 10. It will be appreciated that the particular releasable attachment mechanism for releasably attaching the swirler 20 to the spacers is not only applicable to the ferrule-type spacer, particularly described and illustrated herein, but also to other types of spacers, for example, those defining discrete cells such as disclosed in U.S. Pat. No. 5,209,899 or eggcrate-type spacers. While the description herein specifically discloses ferrules and a ferrule-type spacer, it will be appreciated that other types of fuel rod support structures may be used in conjunction with the releasable swirlers hereof. The term fuel rod support body or bodies thus embraces ferrules as well as unit cells of the type disclosed in U.S. Pat. No. 4,209,899, the fuel rod encompassing structure of eggcrate-type spacers and other types of fuel rod supports employed in spacers.

Figure 3:
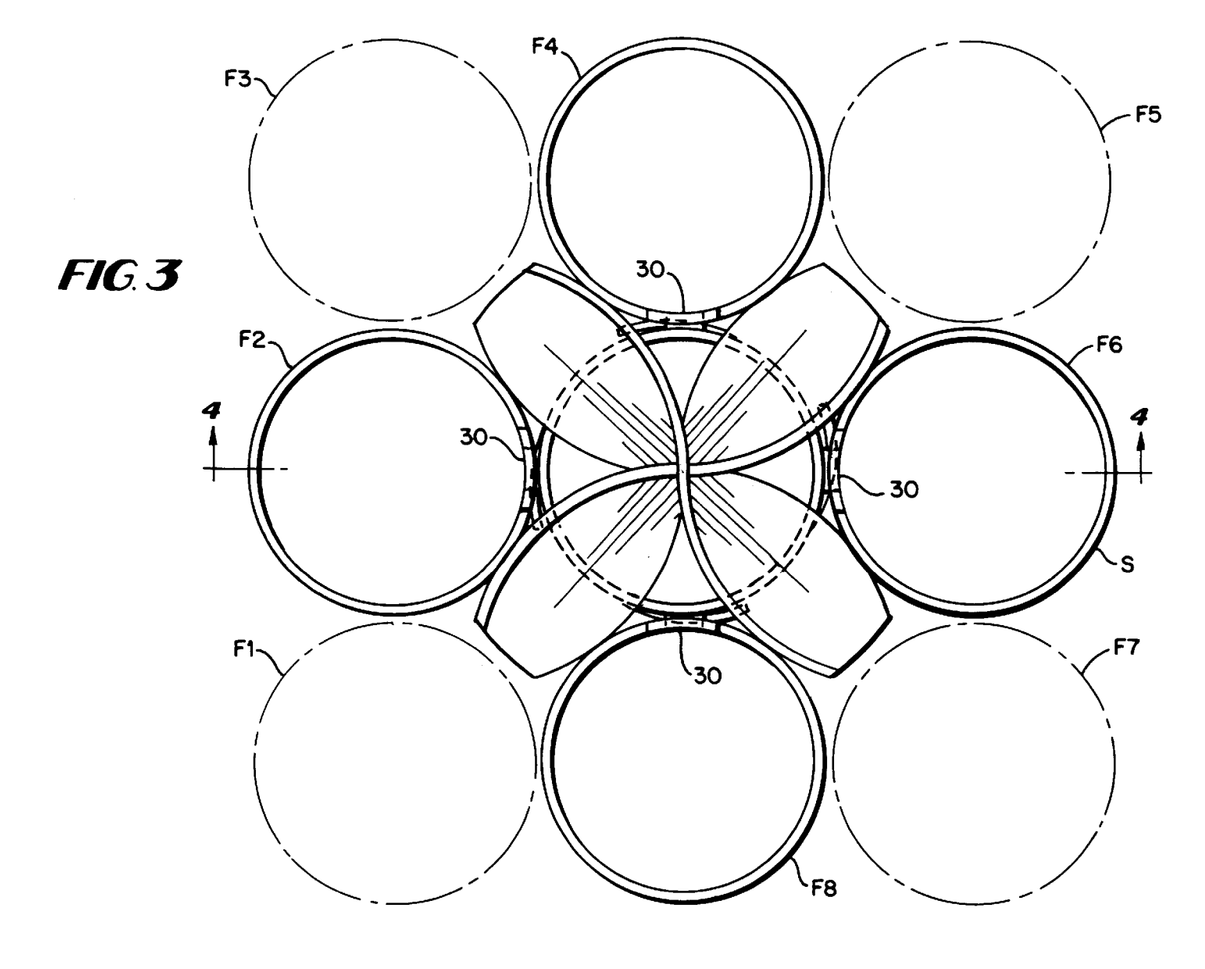
FIG. 3 is an enlarged plan view of the swirler mounted on the spacer.

Referring now to FIG. 3, it will be seen that the spacer S comprises a plurality of generally cylindrical ferrules F1 ... Fn. In the illustration, the ferrules F2, F4, F6 and F8 define the opening therebetween in which would otherwise have been located a further ferrule except for the PLR in that axial position. It will be appreciated that the ferrules are secured one to the other by suitable means in the spacer and that springs are disposed in slots in the sides of the ferrule for biasing the fuel rods passing through the ferrules into appropriate positions relative to the ferrules.

Figure 4:
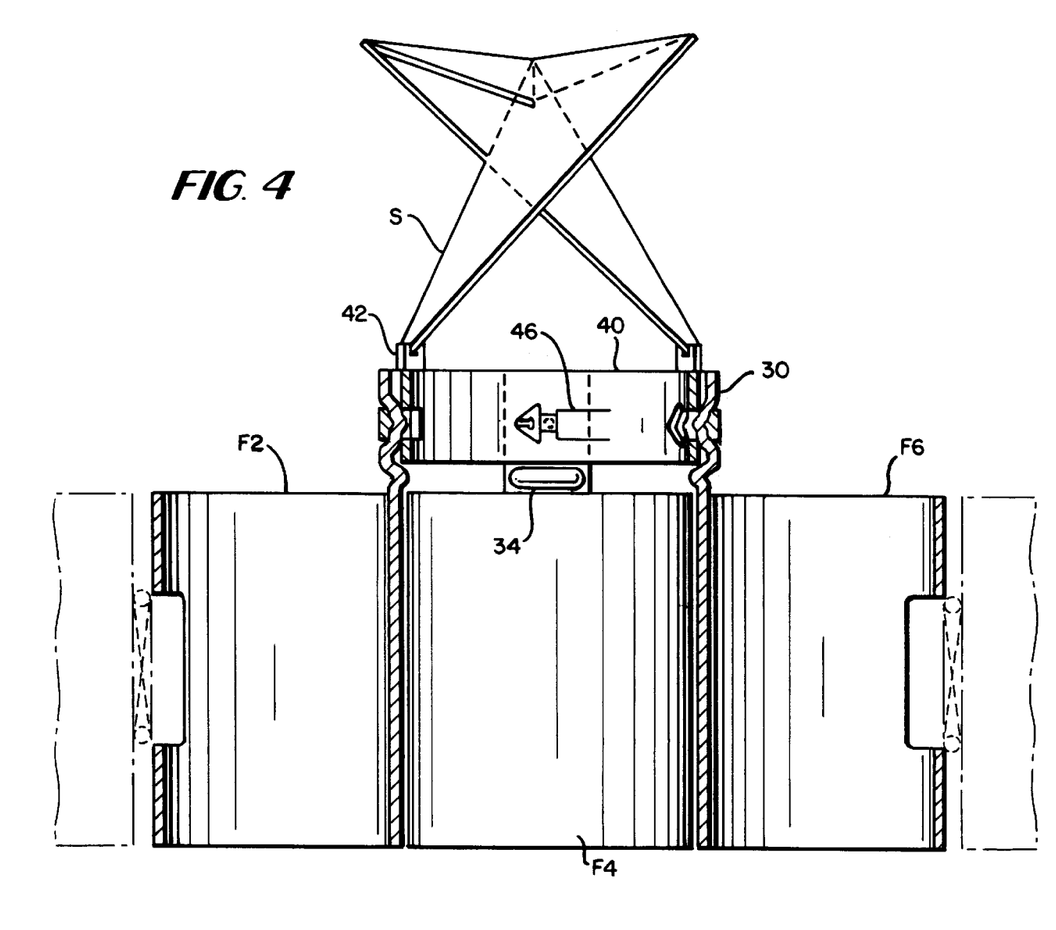
FIG. 4 is a cross-sectional view thereof taken generally about on line 4—4 in FIG. 3.
Figure 5:
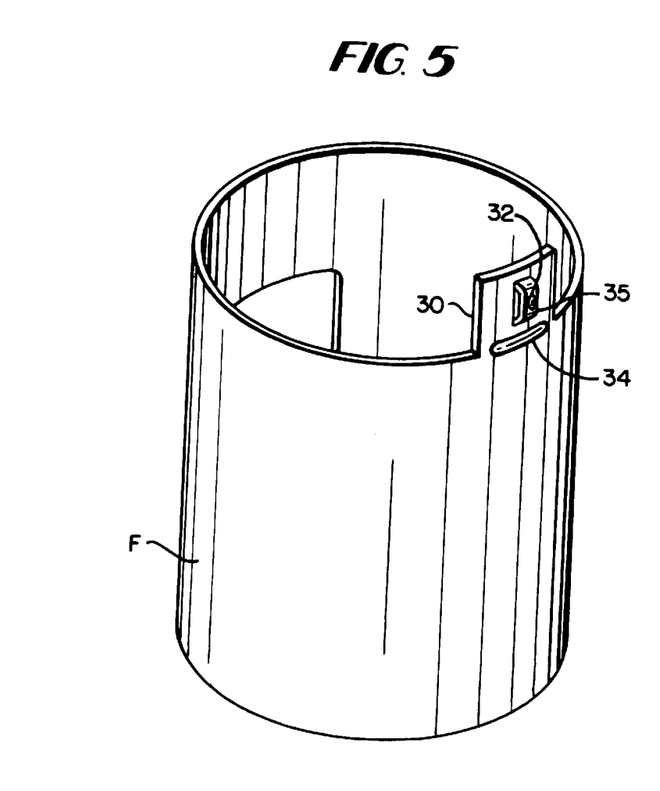
FIG. 5 is a perspective view of a ferrule forming part of the spacer adjacent the opening in the spacer above the part-length fuel rod.

Referring now to FIGS. 4 and 5, at least two of the ferrules on opposite sides of the opening in the spacer, for example, ferrules F2 and F6, and preferably all four ferrules F2, F4, F6 and F8, are each provided with an upstanding tab 30.

Each tab 30 has a segment 32 defined by a pair of slits through the tab 30. Each segment 32 is pressed outwardly of the tab, i.e., in a radial inward direction toward the opening between the ferrules and defines with the associated tab a loop. That is, the segment 32 depressed outwardly of tab 30 defines with tab 30 a slot or loop. Additionally, a radially outwardly projecting dimple 35 is provided in the segment 32 to provide a concave depression along the inside of the loop. Below the segment 32, there is provided an outward projection 34, for purposes which will become clear from the ensuing description.

Figure 6:
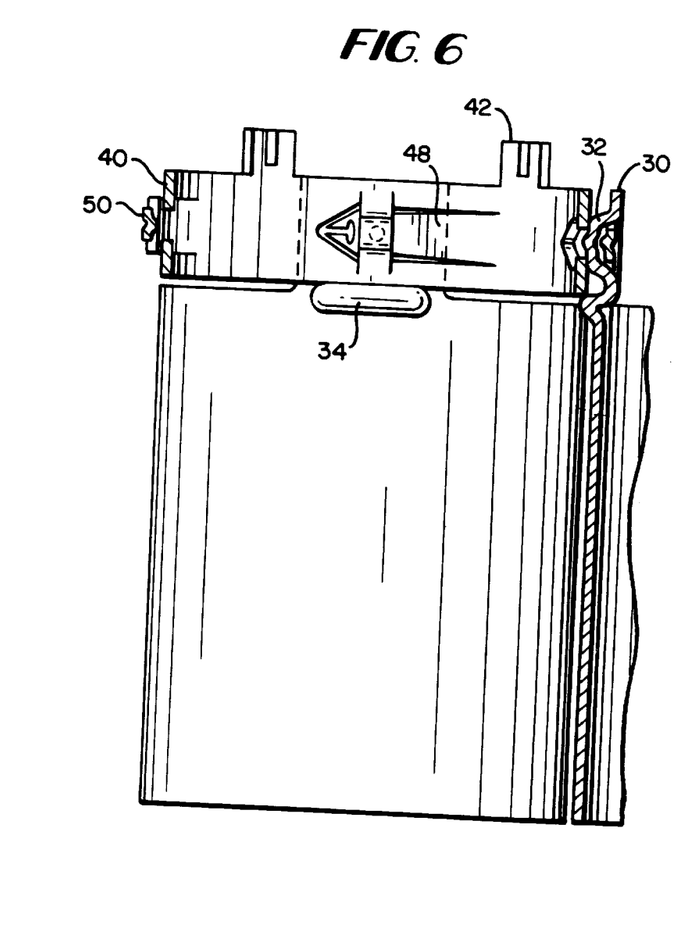
FIG. 6 is a cross-sectional view of the swirler attachment and an adjacent ferrule.

Referring now to FIGS. 4–6, there is illustrated a mounting ring 40 for the swirler S. The mounting ring 40 comprises a circular ring having a plurality of bifurcated upstanding tabs 42 to which the lower extremities of the swirler S may be secured, for example, by welding. In the illustrated form, the flat portions of the lower extremities of the swirler S are received in the slots formed by the bifurcations and are welded to the ring 40.

Figure 7:
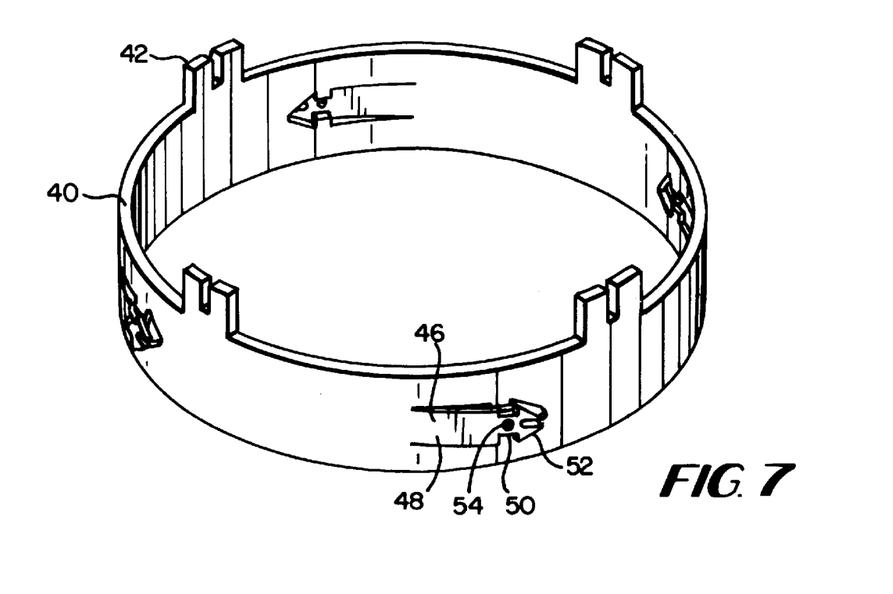
FIG. 7 is a perspective view of a swirler attachment ring.
Figure 8:
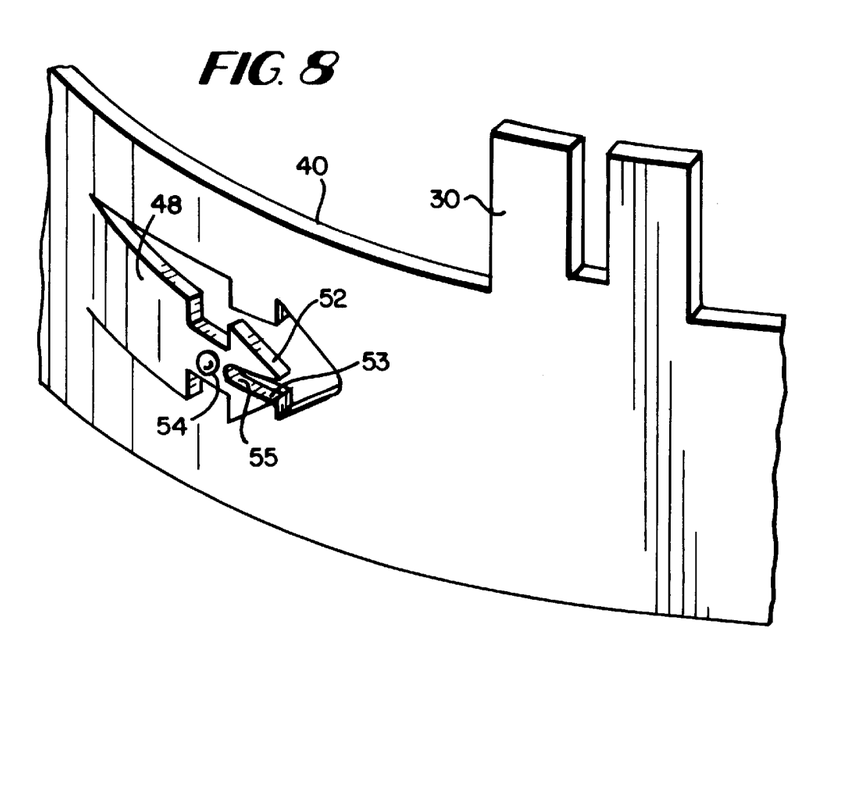
FIG. 8 is an enlarged fragmentary perspective view of the swirler attachment ring illustrating a connecting element.

At circumferentially spaced positions about ring 40 corresponding in number to the number of tabs 30, there are provided connecting members 46 for releasably securing the swirlers and its mounting ring 40 to the ferrules defining the opening through the spacer. The connecting members 46 include a main body 48 which projects radially outwardly of the mounting ring 40, and a shank portion 50 intermediate the main body 48 and a barbed distal end 52 of the member 46. The member 46 may be stamped or punched from the ring 40 in the shape illustrated. The distal end 52 of the member 46 has a longitudinally extending slot 53 with an enlarged proximal portion 55 of the slot whereby the opposite tapered sides of the barbed end 52 can be pressed toward one another and released to resiliently return to their illustrated original position. Note that the shank 50 (FIG. 7) is flanked by flanges formed on the body 48 and the barbed distal end 52. Additionally, a dimple 54 is formed along the outer surface of the shank 50 and projects radially inwardly to form a radial inward projection for registration with the concavity along the inside of loop 32 formed by dimple 35.

To apply the mounting ring 40 and the swirler S carried thereby to the spacer S, it will be appreciated that the mounting ring can be disposed between the upstanding tabs 30 of the ferrules F2 and F6 and preferably additionally ferrules F4 and F8 with the members 46 rotationally misaligned with, i.e., circumferentially spaced from the segments 32. With the members 46 lying between the segments 32 of the circumferentially adjacent tabs 30, the mounting ring 40 can be rotated by a suitable tool, not shown, to locate the distal ends or barbs 52 at the entry of the slot or loop formed between the segment 32 (FIG. 5) and tab 30. Upon further rotation, the tapered sides of the distal end 52 of each member 46 move or squeeze toward one another, enabling insertion of the barbed end 52 through the slot or loop formed by the segment and associated tab. When the shank 50 registers with the segment 32, the side sections of the barbed end 52 resiliently return to their normal position, locking the shank in the slot or loop. The dimple 54 of each member 46 projects into the concavity of the dimple 35 formed in the segment 32 serving as an additional detent retaining the member 46 secured in the loop 32. The swirler is thus locked in place. The registering dimples 35 and 54 not only serve as additional detents but also serve as dampeners to minimize or eliminate vibration of the swirler relative to the supporting ferrules. It will be appreciated that the dimples can be reversed from the configuration described and illustrated, i.e., the dimple 35 could project radially inwardly and dimple 54 project radially outwardly of the swirler, with similar vibration damping and detenting effects.

To remove the swirler and the mounting ring, a suitable tool, not shown, is disposed among the fuel rods to displace the side sections of the barbed end 52 toward one another. When sufficiently displaced, the mounting ring and swirler are rotated in a direction opposite to the direction in which the members 46 were passed through the loops. Thus, the swirler is free from its attachment with the ferrules and can be removed axially through the openings of the spacer.

It will be appreciated that the removable swirler hereof may be employed with different types of spacers other than ferrule spacers. Spacers formed of discrete cells as described in the previously mentioned U.S. patent may be used. By omitting a cell and extending a tab from two or more of the adjacent cells, the swirler hereof can be readily and easily attached to the spacer.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A swirler attachment for a spacer in a nuclear fuel bundle, comprising:
    a plurality of ferrules forming a spacer for receiving nuclear fuel rods of the nuclear fuel bundle, at least a pair of opposed ferrules spaced from one another defining an opening therebetween, said pair of ferrules each having a ferrule body having a connecting element; and
    a swirler carrying at least a pair of connecting members for releasable connection with respective ones of said connecting elements thereby releasably securing said swirler and said pair of ferrules to one another;
    said ferrules having generally parallel axes, the connecting elements of said swirler and said members of said ferrules being releasable from one another in response to rotation of said swirler relative to said pair of ferrules about an axis generally parallel to said axes and passing through said swirler whereby the swirler is removable from the pair of ferrules.

2. A swirler attachment for a spacer in a nuclear fuel bundle, comprising:
    a plurality of ferrules forming a spacer for receiving nuclear fuel rods of the nuclear fuel bundle, at least a pair of opposed ferrules spaced from one another defining an opening therebetween, said pair of ferrules each having a ferrule body having a connecting element; and
    a swirler carrying at least a pair of connecting members for releasable connection with respective ones of said connecting elements thereby releasably securing said swirler and said pair of ferrules to one another;
    said ferrules having generally parallel axes, the connecting elements of said swirler and said members of said ferrules being engageable with one another in response to rotation of said swirler relative to said pair of ferrules about an axis generally parallel to said axes and passing through said swirler whereby the swirler is releasably secured to said pair of ferrules.

3. A swirler attachment for a spacer in a nuclear fuel bundle, comprising:
    a plurality of ferrules forming a spacer for receiving nuclear fuel rods of the nuclear fuel bundle, at least a pair of opposed ferrules spaced from one another defining an opening therebetween, said pair of ferrules each having a ferrule body having a connecting element; and
    a swirler carrying at least a pair of connecting members for releasable connection with respective ones of said connecting elements thereby releasably securing said swirler and said pair of ferrules to one another;
    each ferrule of said pair thereof having a tab upstanding therefrom and lying opposite one another across said opening, said tabs carrying said connecting elements, said swirler including a base and vanes carried by said base, said connecting members carried by said base.

4. A swirler attachment according to claim 3 wherein one of said members and said elements includes a resilient locking tab for releasably engaging another of said member and said element to releasably lock said swirler and said pair of ferrules to one another.

5. A swirler attachment according to claim 3 wherein said base comprises a ring carrying said connecting members, said connecting members projecting radially outwardly of said ring, said connecting elements of said pair of ferrules projecting toward one another, said elements and said members being releasable from one another in response to rotation of said ring relative to said ferrules.

6. A swirler according to claim 3 wherein said base comprises a ring carrying said connecting members, said connecting members projecting radially outwardly of said ring, said connecting elements of said pair of ferrules projecting toward one another, said elements and said members having detents cooperable with one another when said ferrules and said swirler are connected to one another to dampen vibration between said swirler and said ferrules.

7. A swirler attachment for a spacer in a nuclear fuel bundle, comprising:
    a spacer having a plurality of cells for receiving nuclear fuel rods of the nuclear fuel bundle, each cell being defined by a fuel rod support body, at least a pair of opposed bodies spaced from one another defining an opening therebetween, said pair of bodies each having a connecting element; and
    a swirler carrying at least a pair of connecting members for releasable connection with respective ones of said connecting elements thereby releasably securing said swirler and said pair of support bodies to one another;
    said cells in said bodies having generally parallel axes, the connecting elements of said swirler and said members of said bodies being releasable from one another in response to rotation of said swirler relative to said pair of bodies about an axis generally parallel to said axes and passing through said swirler whereby the swirler is removable from said spacer.

8. A swirler attachment for a spacer in a nuclear fuel bundle, comprising:
    a spacer having a plurality of cells for receiving nuclear fuel rods of the nuclear fuel bundle, each cell being defined by a fuel rod support body, at least a pair of opposed bodies spaced from one another defining an opening therebetween, said pair of bodies each having a connecting element; and
    a swirler carrying at least a pair of connecting members for releasable connection with respective ones of said connecting elements thereby releasably securing said swirler and said pair of support bodies to one another;
    said bodies having generally parallel axes, the connecting elements of said swirler and said members of said bodies being engageable with one another in response to rotation of said swirler relative to said bodies about an axis generally parallel to said axes and passing through said swirler whereby the swirler is releasably secured to said spacer.

9. A swirler attachment for a spacer in a nuclear fuel bundle, comprising:

a spacer having a plurality of cells for receiving nuclear fuel rods of the nuclear fuel bundle, each cell being defined by a fuel rod support body, at least a pair of opposed bodies spaced from one another defining an opening therebetween, said pair of bodies each having a connecting element; and a swirler carrying at least a pair of connecting members for releasable connection with respective ones of said connecting elements thereby releasably securing said swirler and said pair of support bodies to one another;

each body of said pair thereof having a tab upstanding therefrom and lying opposite one another across said opening, said tabs carrying said connecting elements, said swirler including a base and vanes carried by said base, said connecting members carried by said base.

10. A swirler attachment according to claim 9 wherein one of said members and said elements includes a resilient locking tab for releasably engaging another of said member and said element to releasably lock said swirler and said bodies to one another.

11. A swirler attachment according to claim 9 wherein said base comprises a ring carrying said connecting members, said connecting members projecting radially outwardly of said ring, said connecting elements of said bodies projecting toward one another, said elements and said members being releasable from one another in response to rotation of said ring relative to said bodies.

12. A swirler attachment according to claim 9 wherein said base comprises a ring carrying said connecting members, said connecting members projecting radially outwardly of said ring, said connecting elements of said pair of ferrules projecting toward one another, said elements and said members having detents cooperable with one another when said ferrules and said swirler are connected to one another to dampen vibration between said swirler and said ferrules.

* * * * *